United States Patent [19]
Holzschuh

[11] Patent Number: 5,666,326
[45] Date of Patent: Sep. 9, 1997

[54] HOMING DEVICE FOR UNDERWATER DIVERS

[76] Inventor: Jack E. Holzschuh, 1327 Aalapapa Dr., Kailua, Hi. 96734

[21] Appl. No.: 633,569

[22] Filed: Apr. 17, 1996

[51] Int. Cl.$^6$ .................................................. G01S 3/801
[52] U.S. Cl. ................................. 367/120; 367/118
[58] Field of Search ........................ 367/118, 120, 367/910

[56] References Cited

U.S. PATENT DOCUMENTS

| 3,267,414 | 8/1966 | Kritz | 340/3 |
|---|---|---|---|
| 3,445,806 | 5/1969 | Band | 340/6 |
| 3,475,721 | 10/1969 | Cappel et al. | 340/6 |
| 3,489,993 | 1/1970 | Massa | 340/6 |
| 3,505,638 | 4/1970 | Watson | 340/6 |
| 3,587,038 | 6/1971 | Massa | 340/6 |
| 3,944,967 | 3/1976 | Acks et al. | 367/117 |
| 3,986,161 | 10/1976 | MacKellar | 367/118 |
| 4,053,889 | 10/1977 | Johnson | 367/101 |
| 4,935,907 | 6/1990 | Friedman | 367/118 |
| 5,148,412 | 9/1992 | Suggs | 367/131 |
| 5,185,725 | 2/1993 | Kent et al. | 367/6 |
| 5,303,206 | 4/1994 | Bemb et al. | 367/127 |
| 5,331,602 | 7/1994 | McLaren | 367/6 |

*Primary Examiner*—Ian J. Lobo
*Attorney, Agent, or Firm*—Robert Carson Godbey

[57] ABSTRACT

This invention is in the field of underwater ultrasonic communications systems, more particularly, underwater acoustic homing devices suitable for diver direction finding. This invention utilizes a single omnidirectional sound source and a simple receiver, located in close proximity to a scuba diver's torso and equipment. The acoustic discontinuity of the diver's torso and equipment provides the required directional sensitivity, thus allowing the device to incorporate the desirable characteristics of flexibility in range in combination with a simple receiver housing.

15 Claims, 3 Drawing Sheets

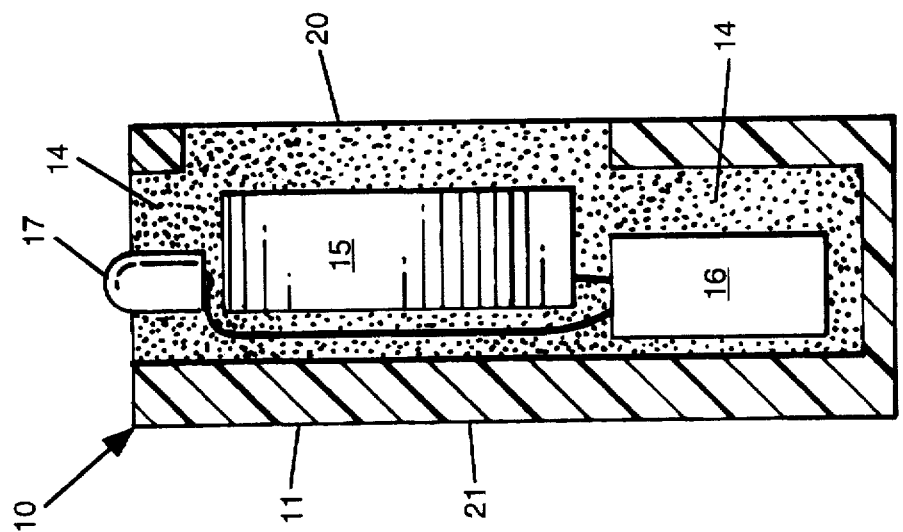
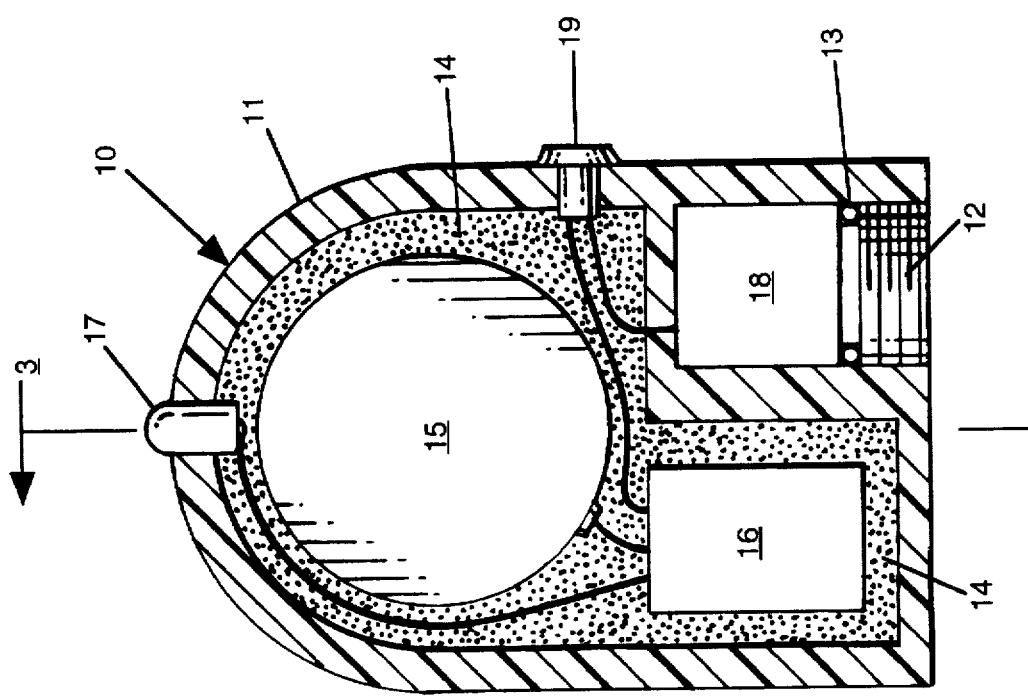

HOMING DEVICE FOR UNDERWATER DIVERS

GOVERNMENT LICENSE RIGHTS

The U.S. Government has a paid-up license in this invention and the right in limited circumstances to require the patent owner to license others on reasonable terms as provided for by the terms of Grant No. MDA972-94-1-0010 awarded by ARPA.

FIELD OF THE INVENTION

This invention is in the field of underwater ultrasonic communication systems, more particularly underwater acoustic homing devices suitable for diver direction finding.

DESCRIPTION OF THE RELATED ART

The related art is rich with systems of varying complexity and capabilities that allow divers to determine the direction, while underwater, to a fixed or moving source of pulsed or continuous sound. In particular, Cappel, et al., U.S. Pat. No. 3,475,721, Massa, U.S. Pat. No. 3,489,993, Watson, U.S. Pat. No. 3,505,638, and Massa, U.S. Pat. No. 3,587,038, teach various ways of specifically realizing this function.

Ideally, an underwater directional system will satisfy two distinct requirements: (1) the system must in some manner modify the inherent omnidirectional response of the receiver transducer so the receiver's response reliably and unambiguously indicates the direction to the source and, (2) the system must have sufficient flexibility in range to be of utility to divers in shallow to deep water, and in clean to dirty water. To quantify, the system should be operable in depths typically from 10 m to 150 m, and in visibility conditions typically from less than 1 m to 30 m. Sport diving utilizing self-contained underwater breathing apparatus ("scuba") is typically in 10 m to 40 m depths, while commercial and military divers can go 150 m and deeper. Likewise, sport diving is done in water having good visibility typically 10 m to 30 m. Commercial and military diving, in contrast, is often in water having very limited visibility, at times less than 1 m to 3 m. When diving at night, visibility is effectively zero. These two requirements of directional sensitivity and flexibility in range will ideally be satisfied by a device that is inexpensive to produce and easy for the diver to use.

Directional Sensitivity. The related art demonstrates two well known methods for satisfying the first requirement of directional sensitivity. One method, used in Massa '993 and Massa '038, is to enclose the receiver transducer in a complex and expensive horn housing. This modifies the receiver transducer's response from omnidirectional to that shown in FIG. 3 of Massa '038. Horn housings and enclosures are well known for substantially reducing the intensity of sound coming from any direction other than directly toward the "horn." To illustrate, consider a well known device used in the early part of this century as a hearing aid, the "ear horn." This device was horn shaped, the small end (output) of which was inserted into the ear canal, and the large end (input) of which was pointed toward the source of sound the listener wished to hear. Sound entering the horn's input undergoes an increase in intensity at the output due to the reducing cross section of the horn. Sound from a direction other than that in which the horn is pointed does not efficiently enter the horn's input, and thus experiences a substantial decrease in intensity at the output. This characteristic furnishes the horn with the required directional sensitivity. Both acoustic and radio frequency literature disclose numerous devices using horns for enhancing their directional response.

The disadvantage of this first method is that the device housing is necessarily complex and expensive. A further disadvantage is that implementation of the device will be limited by the strict requirements of the specific housing technology, so, for example, it may be impossible to integrate such a device efficiently and easily into the standard diver's equipment console.

The second method for realizing the required directional response, used in Cappel '721 and Watson '638, does not specifically modify the response of the receiver transducer, but rather uses the well known "difference in time of arrival at two or more separate receivers" technique. In this technique, the difference in time of arrival of a single sound pulse at two or more closely spaced receiver locations is used to indicate the direction to the source of the sound pulse, relative to the locations of the receivers. Use of this technique to indicate direction requires a minimum of two separated receivers. Again, this technique for determination of the direction to a sound source is well known in the acoustic and radio frequency arts. It is, in fact, the backbone of directional array design technology. Both acoustic and radio frequency literature disclose numerous devices and systems that use this technique to realize both direction finding and directional response.

The disadvantage of this second method of realizing directional sensitivity is that it requires expensive and complex electronics, including multiple receivers.

Flexibility in Range. The second desirable characteristic of an underwater directional system is flexibility in range. The advantages of a system allowing significant distance are obvious. It is equally important for commercial or military diving, however, to have a system that functions effectively at very close distances. Commercial and military diving often takes place in very limited visibility, and it is desirable to have a system that is functional at close range in such circumstances of limited visibility. The related art fails to accommodate effectively this requirement.

A further elaboration needs to be made at this time on the receiver transducer's relative response curves. Both FIG. 5 of the present invention and FIG. 3 of Massa '038 show essentially full response in one direction, hereinafter referred to as "front," and no response in the opposite direction, hereinafter referred to as "back." It is well known in both the acoustic and radio arts that receiver transducers and antennas do not have such a response. Massa '038 states: "The response throughout the region outside the main lobe beam angle falls off to at least 25 dB below the level of sensitivity on the main axis of maximum response." Massa '038 at Col. 4, lines 1–3. This means that the response to a signal coming from the "back" is 25 dB less than the response to signal coming from the "front." In common antenna terms, this would be stated as a 25 dB front to back ratio (F/B). The front to back ratio, F/B, is a critical parameter in determination of range capability.

Both the maximum and minimum range capability of the receiver are determined by two quantities, signal intensity and signal to noise ratio (S/N) at the receiver. Signal intensity is usually the dominant factor in determination of maximum range, whereas signal to noise ratio, S/N, dominates at short ranges. The front to back ratio, F/B, is a major component of the signal to noise ratio, S/N.

For quantification of the maximum and minimum range capabilities of the related art as given in Massa '038, one can utilize its stated values. These are:

F/B =25 dB

Full scale deflection (minimum range)=20 m

Nominal max range (10% full scale deflection)=200 m Massa '038 at Col. 4, lines 65–75.

Analysis of the art disclosed in Massa '038 reveals that, utilizing such technology, as the diver closes to ranges less than the minimum design range, the indication becomes ambiguous. The signal coming from behind the receiver (noise) begins to cause the indicator to deflect. At 2 m the diver will have difficulty determining the direction to the source, under the best of conditions, and at 1 m the diver cannot determine the direction to the source. This situation will usually occur in conditions of poor visibility or at night when the diver needs a clear, unambiguous indication at short ranges.

There are two ways this minimum range situation may be resolved utilizing the existing art. The first is to reduce the source level. This has the disadvantages of either reducing the maximum range capability or requiring multiple sources or a multiple level source to maintain maximum range. The second is to reduce the sensitivity of the receiver, but again this will reduce maximum range capability.

Neither Cappel '720 nor Watson '638 address the issue of maximum or minimum range.

Accordingly it may be seen from the foregoing that the cited art does not have the range capability in the cited configurations to meet the requirement for flexibility in range.

SUMMARY OF THE INVENTION

In view of the failure of the related art to provide an underwater acoustic homing device with sufficient flexibility in range in combination with a simple housing and a single omnidirectional source, the object of the present invention is to provide an improved diver homing device with sufficient flexibility in range, using a small, relatively inexpensive, single transducer receiver, a single omnidirectional source, and the diver's equipment and torso as an acoustic discontinuity.

A first object of the present invention is to provide a simple, single transducer acoustic receiver to aid divers in determining the direction to a fixed or movable source of continuous, pulsed, or spread spectrum sound while they are in deep to shallow, clear to dirty water.

A further object of this invention is to make this receiver small enough so the diver is not encumbered or in any way restricted in movement or activity.

A further object of this invention is to make a receiver that may be housed in a variety of housings with no requirements on these housings other than protection of the transducer and other parts of the receiver from the water environment, as required by the components that comprise the receiver.

A further object of this invention is to make a receiver significantly less expensive to produce than those cited in the related art.

A further object of this invention is to make the interpretation of the output of the receiver, the direction to the source, simple, unambiguous, and reliable.

Devices in the cited related art satisfy some of the above objects, but only the present invention will satisfy all simultaneously. For example, Massa '993 and Massa '038 must be housed in the prescribed housing and will by nature of this housing, a large cylindrical container, encumber and constrain the diver to some degree. Likewise, because of the required complexity of the housing, the device will be expensive to produce.

Watson '638 will not be responsive to other than pulsed sound sources, Cappel '721 can only be used in "deep" water and does not meet the object of housing simplicity and variety. Additionally, both require multiple transducers and both would be expensive to produce.

In the related art discussion, two techniques were discussed for modification of the omnidirectional response characteristics of the receiver transducer, or transducers, to give the required "front only" directional response. This invention uses a third technique, also well known in the acoustics and radio arts, of introducing a discontinuity in the path between the source and the receiver. If the discontinuity is large enough, essentially no sound from the source can reach the receiver. It is clear then that the required "front only" response of the receiver transducer is realized if a discontinuity is placed between the receiver and source when the diver is not facing toward the source. In this invention, this discontinuity is realized using the diver's equipment and torso. To determine the effectiveness of this discontinuity and its capability to meet the requirements of the invention, consider the following analysis.

In the absence of an acoustic discontinuity, the signal level at the receiver decreases as the range from the source to the receiver increases. The signal level at the receiver can be calculated as follows:

RSL=SL-20 log R

Where RSL is the signal level at the receiver in decibels, SL is the source level of the source in decibels, and R is the range in meters from the source to the receiver.

An acoustic discontinuity changes this relationship. It is well documented in acoustic texts that when a sound wave passes from one medium into another, or in effect passes through a discontinuity, its intensity, or proportionally its pressure, will decrease. In simple terms, the most common reason for this decrease is a reflection of the incoming energy from the discontinuity back toward the source. Energy reflected back toward the source is no longer available to propagate onward, so the overall effect is a decrease in signal intensity.

The relative change in magnitude of RSL caused by an acoustic discontinuity is proportional to the ratio of a single characteristic of the two media, the characteristic acoustic impedance. As an example of how this quantity may be used to approximate the loss in RSL, consider the interface between air and water. Regardless of the direction the sound wave travels through the discontinuity (i.e., whether it goes from air to water or water to air), the ratio of acoustic impedance is the same, so the loss in RSL is the same. The ratio of acoustic impedances for air-water is approximately 0.0003. As acoustic quantities are customarily expressed logarithmically, a loss of 35 dB can be calculated, based solely on the ratio of acoustic impedance. A more exact analysis puts this loss at 30 dB. However, the simple approach of using the ratio of the acoustic impedances results in only a 6 dB (2 to 1) error in the actual magnitude of the loss in RSL.

The discontinuity created by the diver's equipment and the diver consists of the diver's air-filled tank or tanks, the diver's buoyancy compensator, and the diver himself. Each of these will be considered separately to illustrate their combined extreme effectiveness in forming the required acoustic barrier.

FIG. 1 shows a diver equipped with scuba gear, which generally includes a tank for compressed air, a regulator, and a buoyancy compensator. When the acoustic receiver is oriented in close proximity to the diver and his equipment (as shown in FIGS. 1 and 5), a sound wave coming from behind the diver first impinges on the diver's tank. This tank is usually an aluminum or steel cylinder about two feet long by 7 inches in diameter. It is, of course, hollow and filled with air. In traversing this barrier, the sound wave encounters the following interfaces: water to steel or aluminum (water to tank), steel or aluminum to air (tank to air), air to steel or aluminum (air to tank), and steel or aluminum to water (tank to water). Based again on the ratio of acoustic impedances of these different media, the loss in RSL on passing through the diver's air tank can be calculated to be 120 dB for aluminum and 130 dB for steel.

The next discontinuity encountered is the diver's buoyancy compensator, a device in almost universal use among sport and commercial scuba divers. A detailed analysis of this device shows that in compensating for buoyancy changes experienced by a diver at 60 ft due to volume changes in his thermal protective suit (wet suit or equivalent), an attenuation of 60 dB can be expected due to the buoyancy compensator.

The final discontinuity encountered is that of the diver himself. In orienting the receiver in the position depicted by FIGS. 1 & 5, the diver's chest cavity is placed between the sound source and the receiver. Again, a detailed analysis of this interface yields a loss of 60 dB in traversing same.

The cumulative effect on the source level at the receiver, RSL, of the multiple discontinuities discussed above results in a total attenuation of 240 dB. It must be pointed out that this is the attenuation in the back arriving sound, or as earlier referred to, the noise, and thus is in actuality the front to back ratio, F/B. This means the front to back ratio of the receiver in the present invention, when positioned in close proximity to the diver and his equipment (as shown in FIGS. 1 & 5) is 240 dB. Even if the above analysis is off by a factor of 10, the front to back ratio is still 220 db, a formidable F/B.

Accordingly, the present invention will clearly and unambiguously indicate to the diver when he is facing the source at ranges of 1 m to 500 m. This is accomplished with a single 160 dB source. The clear and unambiguous indication will function as effectively in dirty water and at night, as it will under "ideal" diving conditions. From the analysis given, it may safely be concluded that the discontinuity characteristics cited are suitable to give sufficient flexibility of range to accomplish this object of the invention.

The preferred and alternative embodiments discussed below will make it abundantly clear that all the objects of the invention can be realized using the discontinuity technique to modify the receiver transducer's response. The above cited and other objects of the invention will become more readily apparent from the ensuing specification and drawings when taken in consideration with the appended claims.

DESCRIPTION OF THE DRAWINGS

FIG. 2 is a sectional view of the receiver as taken through section 2—2 in FIG. 1.

FIG. 3 is a sectional view of the receiver as taken through section 3—3 in FIG. 2.

DESCRIPTION OF PREFERRED EMBODIMENTS

Figure 1:
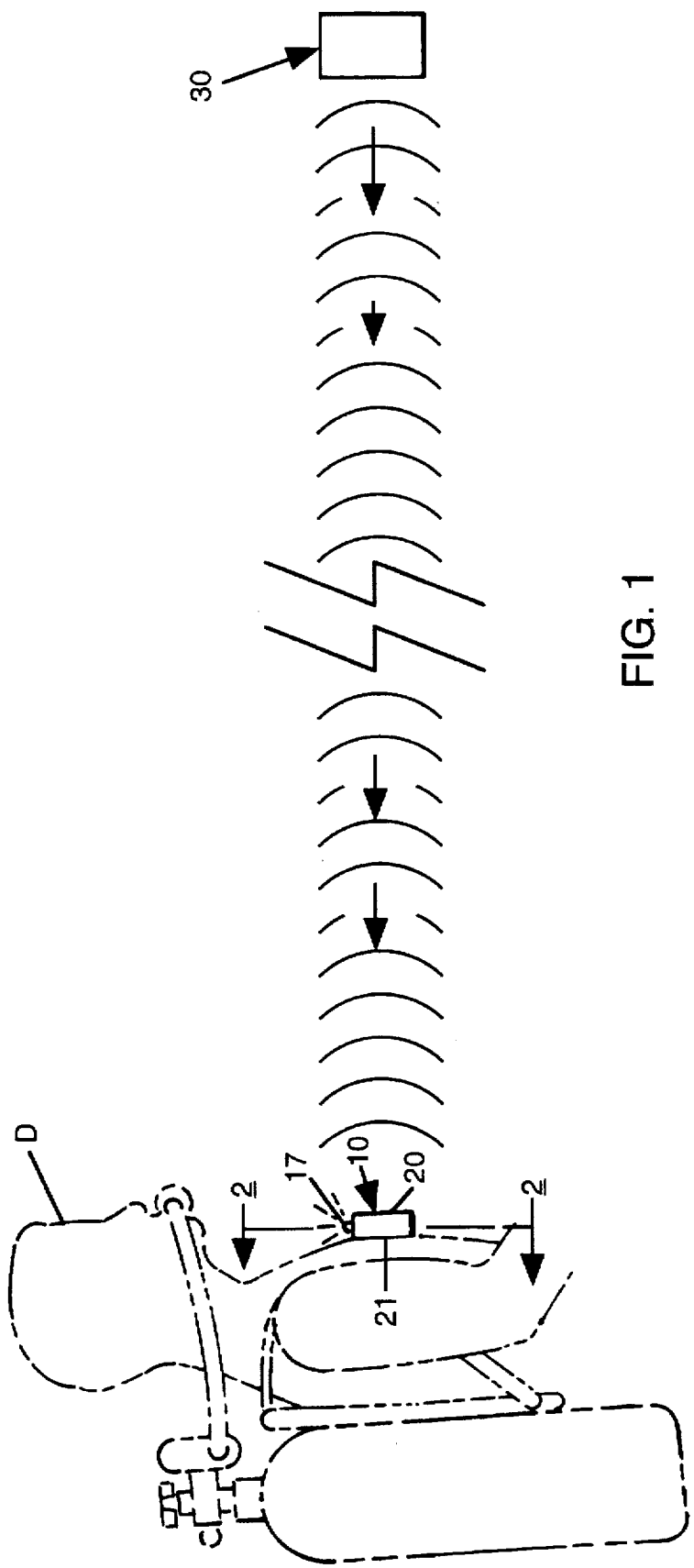
FIG. 1 is a schematic view showing the diver, the receiver, and the sound source.

FIG. 1 shows the three essential elements of the invention, the diver (D) equipped with scuba gear including a tank and regulator, the acoustic receiver (10), and the sound source (30). As illustrated, the indicator (17) is illuminated, indicating the front (20) of the acoustic receiver is directed toward the source (30), and the back (21) of the acoustic receiver is directed away from the source, thus informing the diver that he is facing in the direction of the source.

The preferred embodiment for the source is a fixed level, omnidirectional, ultrasonic pulsed sound source, in the approximate frequency range of 20 kHz to 80 kHz. This frequency range allows the physical dimensions of the receiver to remain small, even at the lower end of the frequency range, and minimizes the attenuation loss in water as the frequency becomes higher. Many sources that meet this requirement are commercially available. Additionally, a source may be designed and fabricated specifically to meet particular frequency, source level, size, lifetime, or any of a number of other requirements, as system use dictates. The flexibility of this invention, however, lends itself to many variations on the preferred embodiment of the source. The source may either be pulsed or continuous wave as the receiver will work with either. Additionally, if a low probability of intercept (LPI) sound source is required, for example for covert or military operations, a spread spectrum source may be used. This type of source will require modification of the receiver electronics for reception of the spread spectrum source. Still other usable embodiments of the source can include frequency and output level control. This control can be manual, automatic, or programmed from an internal or external programmer. The receiver electronics will require modification to accommodate these additional embodiments. These modifications are well within the current electronic art, however, and do not change any objects or essential elements of the invention.

Figure 5:
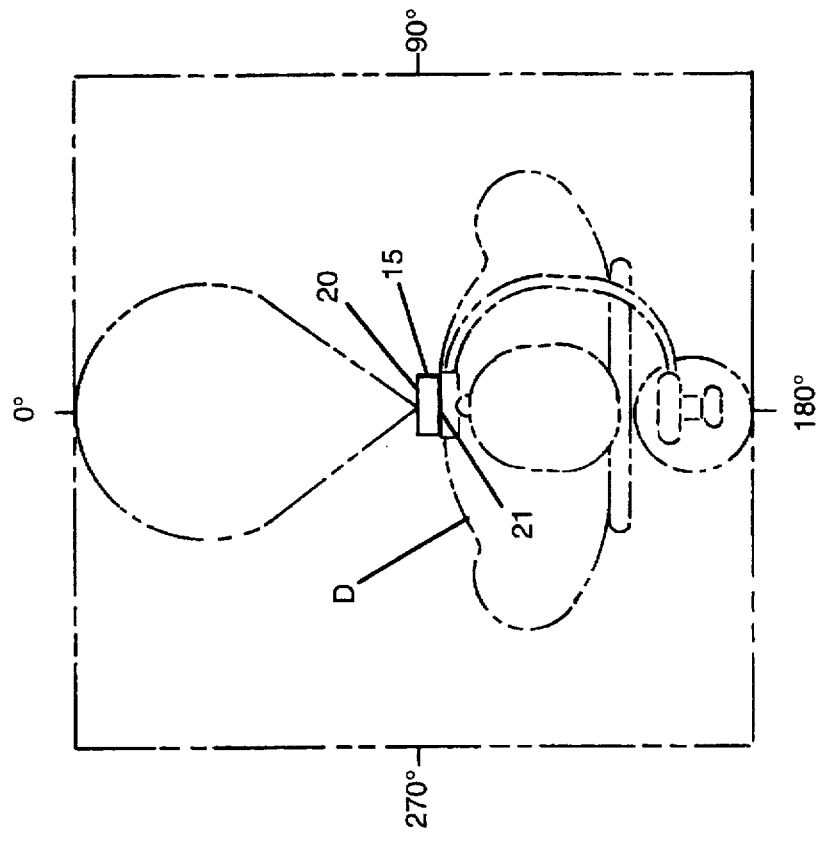
FIG. 5 is a plot of the response of this same receiver transducer when used in the manner described in this invention disclosure.

FIGS. 2 and 3 show the preferred embodiment of the second essential element of the system, the acoustic receiver (10). The body (11) may be any of a variety of materials from injection molded plastic to precision machined metal or composites. The transducer (15) is held within the body with potting compound (14) as are the electronics (16), indicating Light Emitting Diode (LED) (17), switch (19) and battery housing, including battery plug (12), battery seal (13), and battery (18). The battery (18) may be any of a wide variety of currently commercially available batteries. The electronics (16) may include an amplifier, to amplify the signal received by the transducer, a filter as needed to restrict the bandwidth of the signal, and a simple amplitude detector to detect this signal and illuminate the LED (17) when the diver, is facing in the direction of the sound source (30), as shown in FIGS. 1 and 5. All these elements of the electronics are well known to practitioners of the art and there are no requirements on any of them unique to the invention.

Figure 4:
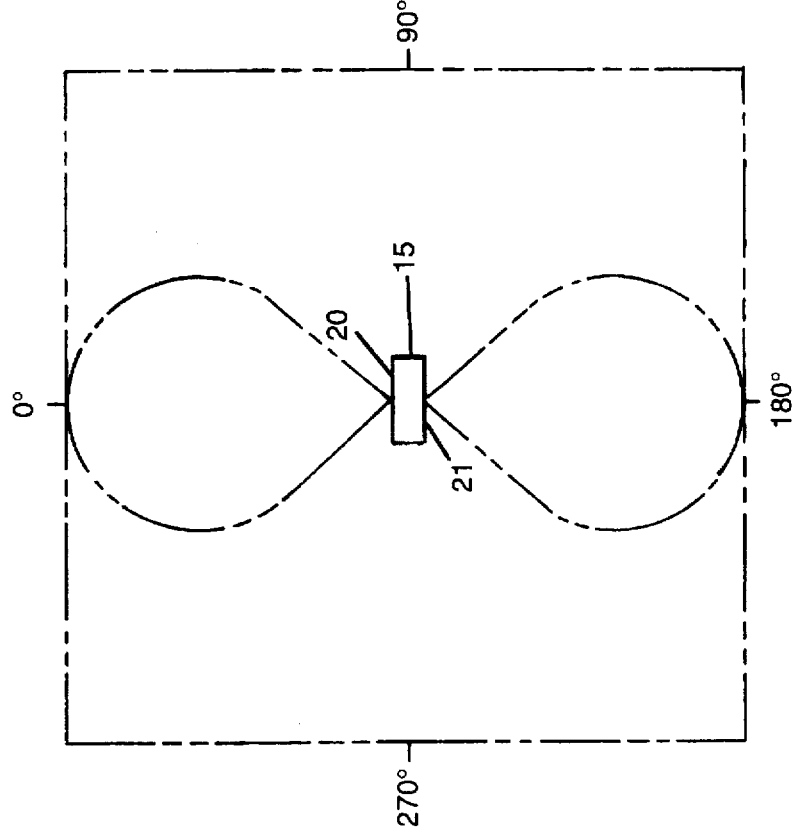
FIG. 4 is a plot of the response of a typical receiver transducer.

FIG. 4 shows the relative response of a typical receiver transducer without any acoustic discontinuities to alter its response characteristics. FIG. 5 shows the relative response of the receiver transducer of this invention, when fixed in close proximity to the front of the diver and his equipment.

As in the case of the source, the flexibility of the invention lends itself to many alternative embodiments of the receiver. For example, the receiver may be packaged in a large number of configurations. To illustrate this versatility, consider the omnidirectional receiver transducer mounted on the back of the diver's tank. Addition of a simple invertor to the detector element of the receiver electronics would then cause the indicator to turn off, rather than on, in response to a signal. Thus, the indicator will still come on when the diver is facing in the direction of the source, the desired direction. While the transducer element's response is not modified, its position and a simple modification to the electronics element of the receiver, make its overall response equivalent to that shown in FIG. 5.

Among the many configurations available to package the receiver is integration of receiver elements with another piece of diving equipment, such as the tank example given above. As a further example, the indicator LED could be integrated into the diver's mask. A final extension of this receiver integration would be to totally integrate the receiver with another item of the diver's equipment, such as for example, a decompression computer.

Alternative embodiments for the transducer are also easily realized. As shown in the preferred embodiment, it is a single disk. It could also consist of a plurality of omnidirectional transducers arranged to enhance a particular characteristic (or characteristics) such as directional sensitivity, sensitivity, shape, or others as determined by particular system requirements. It is important to note here that another requirement on any receiver embodiment is that the receiver transducer have a small cross section when compared to that of the discontinuity. The discontinuity item with the smallest cross section is the diver's air tank, at a diameter of 7 inches nominal. Since the tank is a cylinder, its "effective" cross section can be taken as approximately one half this diameter, a nominal 3½ inches. A transducer with a cross section two-thirds of 3½ inches, or 2 ⅓ inches, will adequately meet the small cross section requirement. Larger transducer cross sections will not necessarily degrade performance, however. Disk transducers 2⅓ inches in diameter can easily be shown to meet all sensitivity and directional requirements for the receiver.

Still other alternative embodiments of the receiver are related to the indicator (17). As shown it is a single LED that illuminates when the diver is facing the source. It may be replaced by a plurality of LEDs configured such that the number illuminated is proportional to the received strength of the source. The single LED indicator may also be replaced, or used in conjunction with, a liquid crystal display.

CONCLUSION

It has been demonstrated that the invention, consisting of the described device positioned in close proximity to the diver's equipment and torso, will accomplish all the objects of the invention. It was also demonstrated that the related art, particularly that described Cappel, et al., U.S. Pat. No. 3,475,721, Massa, U.S. Pat. No. 3,489,993, Watson, U.S. Pat. No. 3,505,638, and Massa, U.S. Pat. No. 3,587,038, fall short of accomplishing at least two of these objects. The major advantages of the present invention over the related art are those of flexibility of range, simplicity with respect to the number of transducers and electronic processing of received signals, flexibility with respect to housings, and significant reduction of the cost to produce the device.

Practitioners of the electro-acoustic arts will recognize many simple variations on the cited embodiments of the invention. Among these can be included adjustable sound sources that will support increases in maximum range of the device; an almost unlimited range of housing configurations for the transmitter and receiver; manual, automatic, or programmable controlled gain, operating frequency, pulse width, and bandwidth; indicators that will give the diver some indication of range to the source; and use of multiple transducers in array configurations to support enhanced sensitivity or directional sensitivity. Still others may be apparent to practitioners of the diving art in the form of multiple tank configurations to increase the cross section of the barrier, buoyancy compensation devices that give enhanced barrier performance, and other techniques for housing and mounting the receiver device to present even less encumbrance to the diver. Still others may occur from time to time and still remain within the body of the invention.

I claim:

1. An underwater acoustic homing device for a diver with scuba equipment comprising:

an omnidirectional pulsed underwater sound source;

an underwater sound receiver consisting of a single omnidirectional transducer, an amplifying means connected to said transducer, a band-pass filter connected to said amplifying means, and an amplitude detector means connected to the filter, said transducer being positioned in close proximity to the diver's torso and equipment whereby the acoustic discontinuity of the diver's torso and equipment causes the strength of the sound to be attenuated at the transducer when the diver's torso and equipment are in the sound path between the source and the transducer;

an indicating means connected to the receiver, whereby reception of the unattenuated sound is indicated.

2. An underwater acoustic homing device as in claim 1 wherein said omnidirectional sound source emits sonic energy in the frequency range from 20 kHz to 80 kHz.

3. An underwater acoustic homing device as in claim 2 further comprising:

a frequency and sonic energy level control means for said omnidirectional sound source, whereby the frequency and level of emitted sonic energy can be controlled manually, automatically, or programmed in from an internal or external programming means.

4. An underwater homing device as in claim 1 wherein said underwater sound receiver transducer is attached to the back of the diver's torso and equipment.

5. An underwater homing device as in claim 1 wherein said underwater sound transducer is fixed in close proximity to the front of the diver.

6. An underwater homing device as in claim 1 wherein said underwater sound receiver is integrated with another item of diving equipment.

7. An underwater homing device as in claim 1 wherein said indicator means is a single Light Emitting Diode.

8. An underwater homing device as in claim 1 wherein said indicator means is a plurality of Light Emitting Diodes configured such that the number of Light Emitting Diodes illuminated is proportional to the amplitude of the received sound.

9. An underwater homing device as in claim 1 wherein said indicator means is a Liquid Crystal Display.

10. An underwater acoustic homing device for divers with scuba equipment comprising:

an omnidirectional continuous wave underwater sound source;

an underwater sound receiver consisting of a single omnidirectional transducer, an amplifying means connected to said transducer, a band-pass filter connected to said amplifying means, and an amplitude detector means connected to the filter, said transducer being positioned in close proximity to the diver's torso and equipment whereby the acoustic discontinuity of the diver's torso and equipment causes the strength of the sound to be attenuated at the transducer when the diver's torso and equipment are in the sound path between the source and the transducer;

an indicating means connected to the receiver, whereby reception of the unattenuated sound is indicated.

11. An underwater acoustic homing device as in claim 10 wherein said continuous sound source emits sonic energy in the frequency range from 20 kHz to 80 kHz.

12. An underwater acoustic homing device as in claim 11 further comprising:

a frequency and sonic energy level control means for said continuous sound source, whereby the frequency and level of emitted sonic energy can be controlled manually, automatically, or programmed in from an internal or external programming means.

13. An underwater acoustic homing device for a diver with scuba equipment comprising:

a spread spectrum underwater sound source;

an underwater matched spread spectrum sound receiver consisting of a single omnidirectional transducer, an amplifying means connected to said transducer, a bandpass filter connected to said amplifying means, and an amplitude detector means connected to the filter, said transducer being positioned in close proximity to the diver's torso and equipment whereby the acoustic discontinuity of the diver's torso and equipment causes the strength of the sound to be attenuated at the transducer when the diver's torso and equipment are in the sound path between the source and the transducer;

an indicating means connected to the receiver, whereby reception of the unattenuated sound is indicated.

14. An underwater acoustic homing device as in claim 13 wherein said spread spectrum sound source emits sonic energy in the frequency range from 20 kHz to 80 kHz.

15. An underwater acoustic homing device as in claim 14 further comprising:

a spectrum and sonic energy level control means for said spread spectrum sound source, whereby the spectrum and level of emitted sonic energy can be controlled manually, automatically, or programmed in from an internal or external programming means.

* * * * *